United States Patent
Ito

[11] Patent Number: 5,883,972
[45] Date of Patent: Mar. 16, 1999

[54] METHOD OF AND APPARATUS FOR PROCESSING IMAGE OUTSIDE IRRADIATION FIELD

[75] Inventor: Wataru Ito, Kanagawa-ken, Japan

[73] Assignee: Fuji Photo Film Co., Ltd., Kanagawa-Ken, Japan

[21] Appl. No.: 912,340

[22] Filed: Aug. 18, 1997

[30] Foreign Application Priority Data

Aug. 16, 1996 [JP] Japan ................................. 8-216237

[51] Int. Cl.$^6$ ................................................. G06K 9/00
[52] U.S. Cl. ................................. 382/132; 378/7; 378/87
[58] Field of Search .................................. 382/132, 131, 382/275, 128; 378/4, 7, 21, 87, 150

[56] References Cited

U.S. PATENT DOCUMENTS

| | | | |
|---|---|---|---|
| 4,816,677 | 3/1989 | Adachi et al. | 378/150 |
| 4,851,678 | 7/1989 | Adachi et al. | 250/327.2 |
| 4,967,079 | 10/1990 | Shimura | 250/327.2 |
| 5,068,907 | 11/1991 | Takeo | 382/48 |
| 5,081,580 | 1/1992 | Takeo | 364/413.13 |
| 5,157,733 | 10/1992 | Takeo et al. | 382/132 |
| 5,651,042 | 7/1997 | Dewaele | 382/132 |
| 5,684,888 | 11/1997 | Vuylsteke | 382/132 |
| 5,732,149 | 3/1998 | Kido et al. | 382/132 |
| 5,764,791 | 6/1998 | Hara | 382/132 |

FOREIGN PATENT DOCUMENTS

| | | | |
|---|---|---|---|
| 3-98174 | 4/1991 | Japan | G06F 15/68 |
| 7-226882 | 8/1995 | Japan | H04N 5/325 |

*Primary Examiner*—Amelia Au
*Assistant Examiner*—Gilberto Frederick, II
*Attorney, Agent, or Firm*—Sughrue, Mion, Zinn, Macpeak & Seas, PLLC

[57] ABSTRACT

A radiation image which has been recorded using an irradiation field stop and has an irradiation field is read out and an image representing the radiation image is obtained. The irradiation field is recognized and the values of the image signal components corresponding to the picture elements recognized to be outside the irradiation field out of the image signal components which make up an image signal for reproducing the radiation image as a visible image are converted according to the following formula, $$g(x,y) = h(t) \cdot f(x,y) + \{1 - h(t)\} \cdot f_{max}$$

wherein $f(x,y)$ and $g(x,y)$ respectively represent the values of a picture element in a position $(x,y)$ before and after the conversion, $f_{max}$ represents a maximum density and $h(t)$ represents a continuous differentiable function.

2 Claims, 3 Drawing Sheets

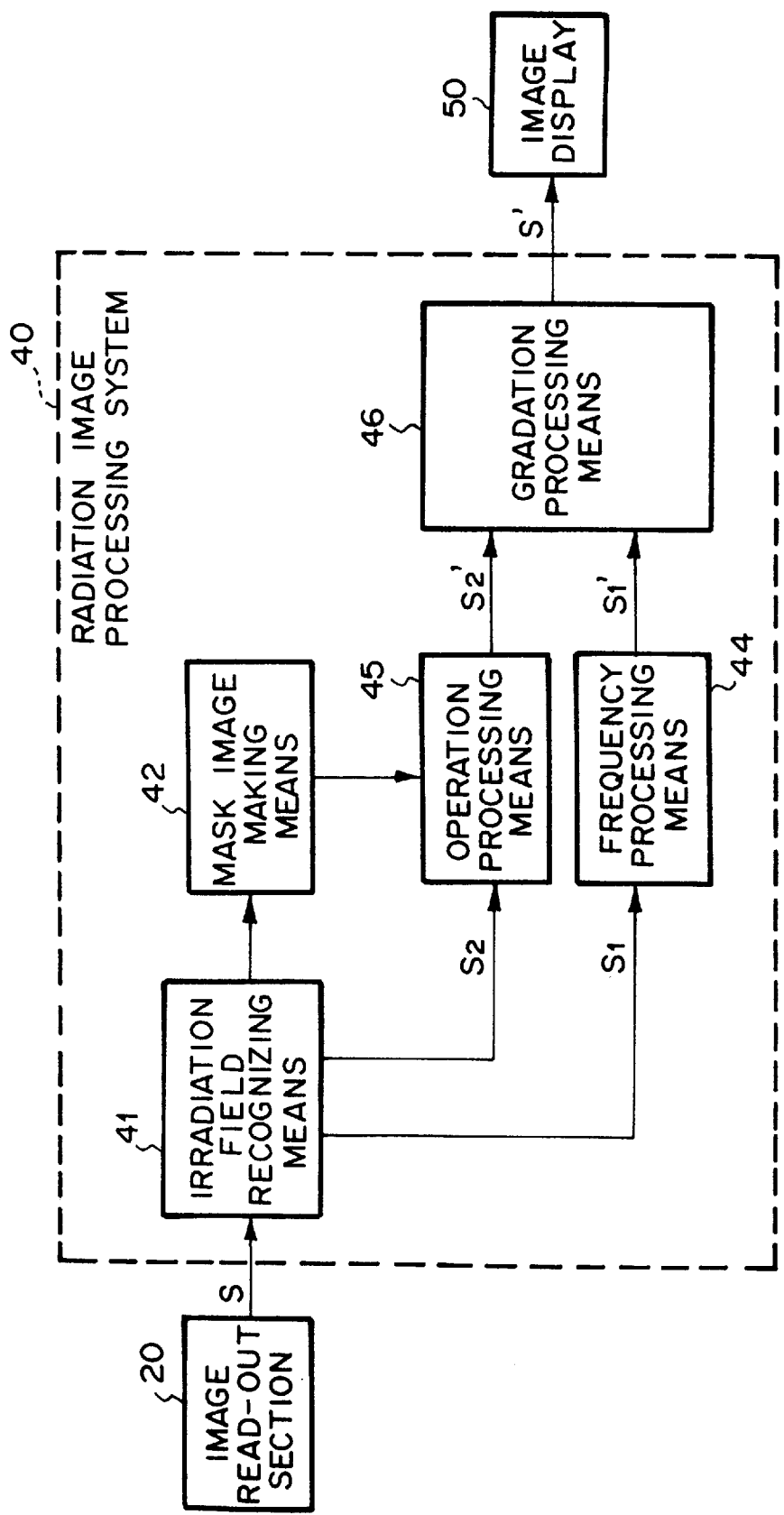

METHOD OF AND APPARATUS FOR PROCESSING IMAGE OUTSIDE IRRADIATION FIELD

BACKGROUND OF THE INVENTION

1. Field of the Invention

This invention relates to a method of and apparatus for carrying out image processing on an image signal obtained from a recording sheet on which a radiation image is recorded and particularly on an image signal representing a radiation image recorded using an irradiation field stop for limiting the irradiation field of radiations.

2. Description of the Related Art

Carrying out a suitable image processing on an image signal obtained by reading a recorded radiation image and reproducing a visible image on the basis of the processed image signal have been practiced in various fields, for instance, in a radiation image recording and reproducing system using stimulable phosphore sheets disclosed in our many patent applications.

When recording a radiation image on a recording sheet, it is often desired that portions of the object not related to diagnosis or the like be prevented from being exposed to radiations, thereby preventing adverse influence of radiations on the object. Further when the object portions not related to diagnosis or the like are exposed to radiations, the radiations are scattered by such portions and the quality of the radiation image is lowered by the scattered radiations. Therefore, an irradiation filed stop is often used in order to limit the irradiation field so that the radiations are irradiated only on the necessary part of the object.

In such a case, the read-out conditions and image processing conditions are determined on the basis of the image signal components corresponding to the picture elements in the irradiation field. The irradiation field can be recognized, for instance, in the following manner as disclosed in U.S. Pat. No. 4,967,079. That is, image signal components for picture elements on each of a plurality of radial linear segments joining a predetermined point in the irradiation field and a plurality of points on the edges of the recording sheet are read out, and a prospective edge point, which is considered to be on the edge of the irradiation field, is determined for each segment, and the irradiation field is recognized as a region which is circumscribed by a line passing through the prospective edge points.

The radiation image is reproduced, for instance, on a CRT as a visible image or recorded on a photographic film as a visible image by use of a laser printer or the like on the basis of an image signal obtained according to the read-out condition and the image processing conditions thus determined.

However in the case where the radiation image, which is the original of the visible image, is recorded by use of an irradiation field stop, the area of the reproduced image corresponding to the area outside the irradiation field is high in brightness (as reproduced on the CRT) or low in density (as recorded on the film) since the area outside the irradiation field is hardly exposed to radiations. Strong light impinging upon the eyes from the area outside the irradiation field makes the image in the irradiation field difficult to view no matter how high the quality of the image in the irradiation field is. In order to overcome such a problem, conventionally a light-shielding plate or the like is sometimes disposed on the CRT or the film to block light from the area outside the irradiation field.

However since the shape and/or size of the irradiation field differ according to the object, it is troublesome to change the position of the light-shielding plate by the shape and/or size of the irradiation field. Further it is very difficult to clearly separate the area inside the irradiation field from the area outside the irradiation field by the light-shielding plate, and the light-shielding plate sometimes covers up to the edge of the irradiation field and sometimes permits leak of light from the area outside the irradiation field. Thus, the light-shielding plate cannot satisfactorily overcome the aforesaid problem of difficulties in viewing the image in the irradiation field due to light from the area outside the irradiation field.

In the method of and apparatus for processing a radiation image disclosed in Japanese Unexamined Patent Publication No. 3(1991)-98174, the image signal components for picture elements outside the irradiation field are set to a low brightness (when a visible image is reproduced as a brightness distribution on a CRT or the like) or high density (when a visible image is reproduced as a density distribution on film or the like), generally to a minimum brightness or a maximum density, thereby obtaining a visible image free from strong light impinging upon the eyes from the area outside the irradiation field.

However when the area outside the irradiation field is set uniformly to a maximum density (or a minimum brightness), the density of the reproduced image sharply increased to the maximum density along the edge of the irradiation field, which is unnatural.

Further generally the irradiation field cannot be always recognized precisely and an area narrower than the actual irradiation field can be sometimes mistaken for the irradiation field. In such a case, a part of the radiation image which should be viewed for, for instance, diagnostic purposes can exist in the area determined to be outside the irradiation field. The image processing employed in the above identified Japanese patent publication results in a cut in such a necessary part of the image signal which is determined to be outside the irradiation field by mistake.

In the image processing disclosed in Japanese Unexamined Patent Publication No. 7(1995)-226882, the value of each picture element in the area outside the irradiation field is converted according to the following formula.

$$g(x,y)=a \cdot f(x,y)+(1-a) \cdot f_{max}$$

wherein f(x,y) and g(x,y) respectively represent the values of the picture element in a position (x,y) before and after the conversion, $f_{max}$ represents a maximum density, and a represents a coefficient which is 1 for picture elements within the irradiation field and is linearly reduced as the distance of the picture element from the edge of the irradiation field increases as shown in FIG. 4 for picture elements outside the irradiation field (0≦a≦1). In accordance with this processing, change in density near the edge of the irradiation field in the reproduced image can be smoothened to some extent and the reproduced image is free from strong light impinging upon the eyes when viewing the reproduced visible image without cutting a necessary part of the image signal which is determined to be outside the irradiation field by mistake.

However since the coefficient a is discontinuous on the edge of the irradiation field where a=1 and at portions outside the irradiation field where a=0, an artifact in the form of double lines appears in the reproduced image along the edge of the irradiation field, which adversely affects diagnosis through the reproduced image.

SUMMARY OF THE INVENTION

In view of the foregoing observations and description, the primary object of the present invention is to provide a method of and apparatus for carrying out image processing on an image signal of a radiation image so that the reproduced visible image is free from artifact and strong light impinging upon the eyes when viewing the reproduced visible image.

In accordance with one aspect of the present invention, there is provided a method of carrying out image processing on an image signal representing a radiation image which has been recorded using an irradiation field stop and has an irradiation field, comprising the steps of recognizing the irradiation field and converting the values of the image signal components corresponding to the picture elements recognized to be outside the irradiation field out of the image signal components which make up an image signal for reproducing the radiation image as a visible image according to a predetermined conversion formula, wherein the improvement comprises that the values of the picture elements in the area outside the irradiation field are converted according to the following formula, $$g(x,y) = h(t) \cdot f(x,y) + \{1 - h(t)\} \cdot f_{max}$$

wherein $f(x,y)$ and $g(x,y)$ respectively represent the values of a picture element in a position $(x,y)$ before and after the conversion, $f_{max}$ represents a maximum density and $h(t)$ represents a continuous differentiable function.

In accordance with another aspect of the present invention, there is provided an apparatus for carrying out image processing on an image signal representing a radiation image which has been recorded using an irradiation field stop and has an irradiation field, comprising a means for recognizing the irradiation field and a conversion means for converting the values of the image signal components corresponding to the picture elements recognized to be outside the irradiation field out of the image signal components which make up an image signal for reproducing the radiation image as a visible image according to the following formula, $$g(x,y) = h(t) \cdot f(x,y) + \{1 - h(t)\} \cdot f_{max}$$

wherein $f(x,y)$ and $g(x,y)$ respectively represent the values of a picture element in a position $(x,y)$ before and after the conversion, $f_{max}$ represents a maximum density and $h(t)$ represents a continuous differentiable function.

The term "maximum density" as used here means a maximum density in the case the visible image is reproduced as a density distribution and should be reread as a minimum brightness in the case the visible image is reproduced as a brightness distribution on a CRT or the like.

In the present invention, the irradiation field may be recognized by any suitable algorism. For example, the method of recognizing the irradiation field based on the assumption that the irradiation field is square (disclosed, for instance, in U.S. Pat. Nos. 4,851,678; 5,068,907 and 5,081,580) and the method disclosed in the aforesaid U.S. Pat. No. 4,967,079 can be employed as well as other various methods.

In accordance with the present invention, since the image signal components corresponding to the picture elements recognized to be outside the irradiation field are converted according to the aforesaid conversion formula, the reproduced visible image is free from artifact.

Further the part of the reproduced image corresponding to the area recognized to be outside the irradiation field becomes low in brightness or high in density in the whole, whereby the reproduced image is free from strong light impinging upon the eyes when viewing the reproduced visible image. Further even when an area narrower than the actual irradiation field is mistaken for the irradiation field, whether the area determined to be outside the irradiation field includes a necessary part of the radiation image can be known since the image signal components corresponding to the picture elements recognized to be outside the irradiation field are not set to a uniform brightness or density as in the conventional method but still keep difference in brightness or density according to the original values of the image signal components.

BRIEF DESCRIPTION OF THE DRAWING

FIG. 1 is a block diagram showing a radiation image reproducing system in which a radiation image processing system in accordance with an embodiment of the present invention is employed.

DESCRIPTION OF THE PREFERRED EMBODIMENT

Figure 2A:
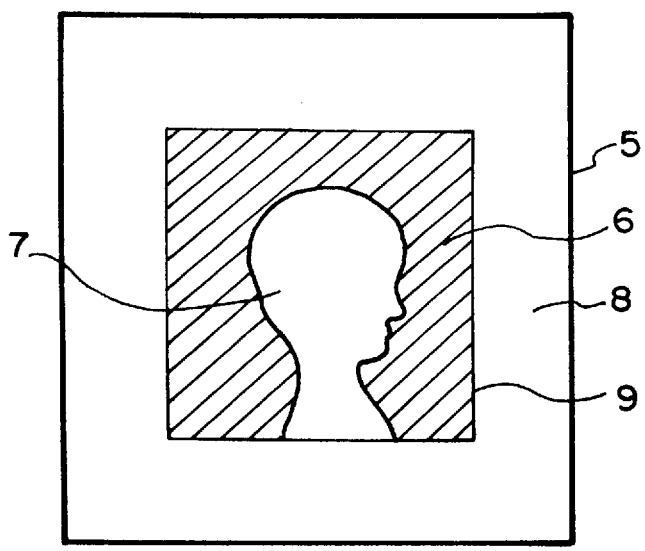
FIGS. 2A and 2B are views for illustrating preparation of the mask image.

The radiation image reproducing system shown in FIG. 1 comprises a read-out section 20 which reads out a radiation image stored on a stimulable phosphor sheet, a radiation image processing system 40 which recognizes an irradiation field on the basis of an image signal S read out by the read-out section 20 and carries out an image processing on the final image signal S and an image display means 50 such as a CRT which displays a visible image on the basis of a processed image signal S' processed by the image processing system 40.

The image processing system 40 comprises an irradiation field recognizing means 41 which recognizes the irradiation field of the radiation image on the basis of the image signal S, a mask image making means 42 which makes a mask image where the values of the picture elements recognized to be inside the irradiation field are all set to 0 and the value of each of the picture element recognized to be outside the irradiation field is set to a value depending on the distance of the picture element from the edge of the irradiation field, a frequency processing means 44 which carries out a frequency processing on the image signal S1 for the irradiation field, an operation processing means 45 which carries out a predetermined operation on the image signal S2 for the area outside the irradiation field using the mask image made by the mask image making means 42, and a gradation processing means 46 which carries out a gradation processing on the image signal S1' obtained by processing by the frequency processing means 41 and the image signal S2' obtained by processing by the operation processing means 45.

The radiation image stored on the stimulable phosphor sheet is read out by the read-out section 20 and the image signal read out is digitized and input into the image processing system 40 as an image signal S. In the image processing system 40, the irradiation field is first recognized on the basis of the image signal S by the irradiation field recognizing means 41. As shown in FIG. 2A, the radiation image 5 stored on the stimulable phosphor sheet has an irradiation field 6 (the hatched portion) and a radiation image 7 of an object is formed in the irradiation field 6. The irradiation field recognizing means 41 recognizes the edge 9 of the irradiation field 6, thereby separating the area 8 outside the irradiation field 6 from the area inside the irradiation field 6. The irradiation field 6 can be recognized by various methods and may be recognized, for instance, by a method disclosed in U.S. Pat. No. 4,967,079.

The information on the irradiation field recognized by the irradiation field recognizing means 41 and the image signal S are input into the mask image making means 42, and the image signal S1 for the irradiation field and the image signal S2 for the area outside the irradiation field are respectively input into the frequency processing means 44 and the operation processing means 45.

Figure 2B:
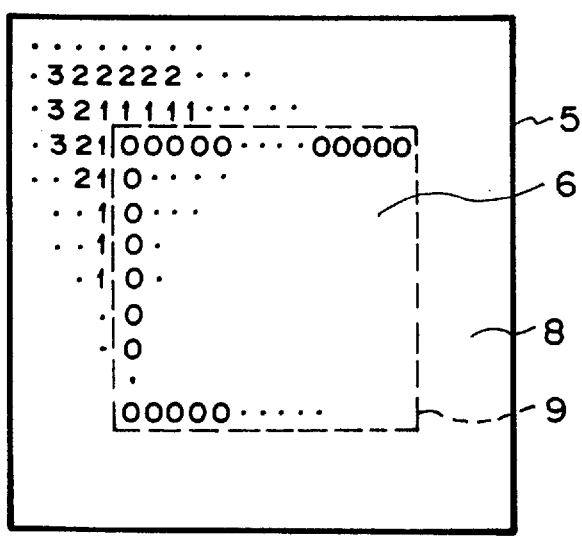

The mask image making means 42 makes a mask image where the values of the picture elements recognized to be inside the irradiation field 6 including the image 7 of the object are all set to 0 and the value of each of the picture element in the area 8 outside the irradiation field 6 is set to a value depending on the distance of the picture element from the edge 9 of the irradiation field 6. As shown in FIG. 2B, in the mask image, the values of the picture elements adjacent to the edge of the irradiation field 6 are set to 1 and the value of each picture element is increased as distance of the picture element from the edge 9 increases. The value of each picture element which depends upon distance of the picture element from the edge 9 is referred to as "t-value" and the image represented by the t-values is referred to as "t-image". The information on the t-values is input into the operation processing means 45.

Figure 3:
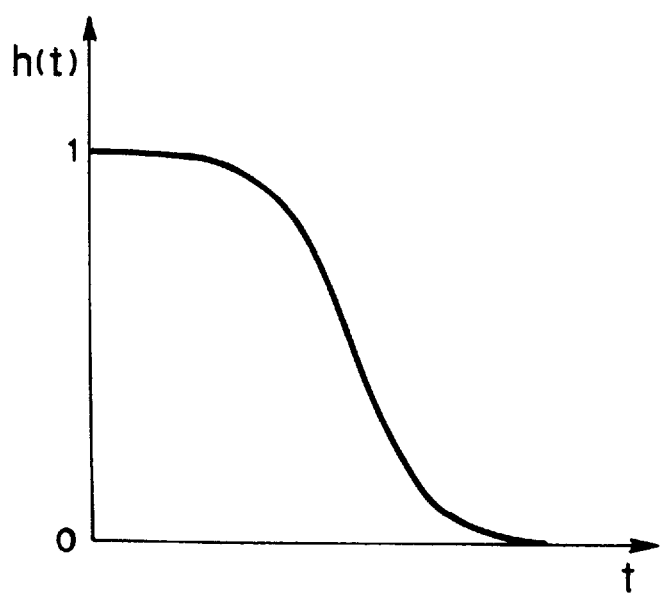
FIG. 3 is a view showing the function employed in the radiation image processing system.
Figure 4:
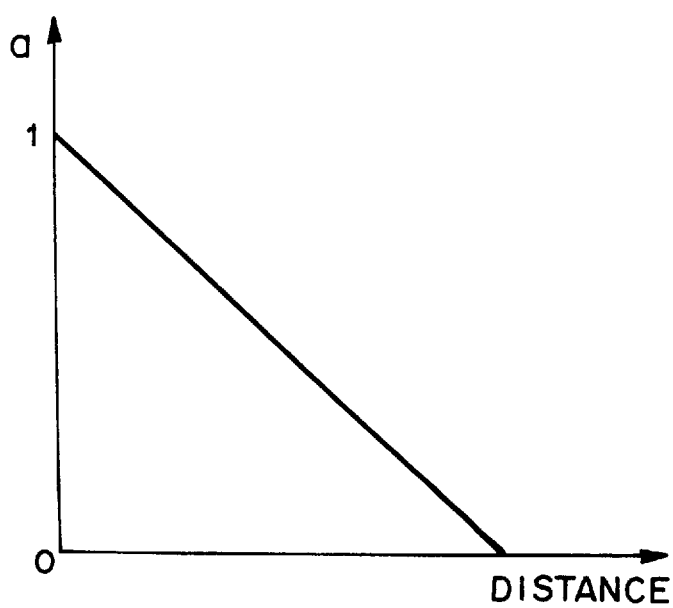
FIG. 4 is a view showing the function employed in the conventional image processing.

The operation processing means 45 carries out on the image signal S2 for the area outside the irradiation field an operation processing according to the following conversion formula.

$$g(x,y)=h(t) \cdot f(x,y)+\{1-h(t)\} \cdot f_{max}$$

wherein f(x,y) and g(x,y) respectively represent the values of a picture element in a position (x,y) before and after the conversion, $f_{max}$ represents a minimum brightness (or a maximum density) and h(t) represents a t-value-dependent function which is a continuous differentiable function as shown in FIG. 3.

A suitable frequency processing is carried out, as required, on the image signal S1 for the irradiation field by the frequency processing means 44.

A gradation processing is carried out by the gradation processing means 46 on the processed image signals S1' and S2' respectively processed by the frequency processing means 44 and the operation processing means 45 and input into the image display means 50 as a final image signal S'.

Then the image display means 50 reproduces a visible image on the basis of the final image signal S'.

In the visible image, since the image signal for the area outside the irradiation field has been converted according to a conversion formula including the original values of the picture elements and a function dependent upon the distances of the picture elements from the edge of the irradiation field, artifact does not appear along the edge of the irradiation field.

Further the part of the reproduced image corresponding to the area recognized to be outside the irradiation field becomes low in brightness or high in density in the whole, whereby the reproduced image is free from strong light impinging upon the eyes when viewing the reproduced visible image.

Further even when an area narrower than the actual irradiation field is mistaken for the irradiation field, whether the area determined to be outside the irradiation field includes a necessary part of the radiation image can be known since the image signal components corresponding to the picture elements recognized to be outside the irradiation field are not set to a uniform brightness or density as in the conventional method but still keep difference in brightness or density according to the original values of the image signal components.

Though, in the embodiment described above, the irradiation field is recognized on the basis of an image signal obtained by read-out and a visible image is reproduced according to the image signal, the present invention can be applied also to a system in which a preliminary read-out is carried out and a final read-out is carried out on the basis of data on the radiation image obtained by the preliminary read-out.

Further though, in the embodiment described above, the visible image is reproduced on a CRT, the present invention may be applied to a system in which the visible image is recorded on a photographic film by use of a laser printer or the like.

Further the present invention may be applied to a system where an X-ray film or the like is used in place of the stimulable phosphor sheet.

What is claimed is:

1. A method of carrying out image processing on an image signal representing a radiation image which has been recorded using an irradiation field stop and has an irradiation field, comprising the steps of recognizing the irradiation field and converting the values of the image signal components corresponding to the picture elements recognized to be outside the irradiation field out of the image signal components which make up an image signal for reproducing the radiation image as a visible image according to a predetermined conversion formula, wherein the improvement comprises that the values of the picture elements in the area outside the irradiation field are converted according to the following formula, $$g(x,y)=h(t) \cdot f(x,y)+\{1-h(t)\} \cdot f_{max}$$

wherein f(x,y) and g(x,y) respectively represent the values of a picture element in a position (x,y) before and after the conversion, $f_{max}$ represents a maximum density and h(t) represents a continuous differentiable function.

2. An apparatus for carrying out image processing on an image signal representing a radiation image which has been recorded using an irradiation field stop and has an irradiation field, comprising a means for recognizing the irradiation field and a conversion means for converting the values of the image signal components corresponding to the picture elements recognized to be outside the irradiation field out of the image signal components which make up an image signal for reproducing the radiation image as a visible image according to the following formula, $$g(x,y)=h(t) \cdot f(x,y)+\{1-h(t)\} \cdot f_{max}$$

wherein f(x,y) and g(x,y) respectively represent the values of a picture element in a position (x,y) before and after the conversion, $f_{max}$ represents a maximum density and h(t) represents a continuous differentiable function.

* * * * *